(12) United States Patent
Skalla et al.

(10) Patent No.: US 6,367,606 B1
(45) Date of Patent: Apr. 9, 2002

(54) CONCRETE CHUTE WITH LINER

(75) Inventors: John R. Skalla, Muskego; Kevin J. Quinn, Hortonville, both of WI (US)

(73) Assignee: SOQ, LLC, Hortonville, WI (US)

( * ) Notice: Subject to any disclaimer, the term of this patent is extended or adjusted under 35 U.S.C. 154(b) by 0 days.

(21) Appl. No.: 09/675,792

(22) Filed: Sep. 29, 2000

Related U.S. Application Data

(60) Provisional application No. 60/159,816, filed on Oct. 15, 1999.

(51) Int. Cl.[7] .............................................. B65G 11/00
(52) U.S. Cl. ............................. 193/6; 193/2 R; 193/5; 193/4; 193/33
(58) Field of Search ......................... 193/6, 4, 5, 2 R, 193/33

(56) References Cited

U.S. PATENT DOCUMENTS

| | | | | | |
|---|---|---|---|---|---|
| 1,133,692 | A | * | 3/1915 | Adams | 193/2 R |
| 4,054,194 | A | * | 10/1977 | Davis | 193/10 |
| 4,190,144 | A | | 2/1980 | Lybbert | 193/10 |
| 4,234,182 | A | * | 11/1980 | Camillen | 193/2 R |
| 4,529,660 | A | * | 7/1985 | Heim | 193/2 D |
| 4,645,055 | A | * | 2/1987 | Griese et al. | 138/110 |
| 5,184,706 | A | * | 2/1993 | Christenson | 193/2 R |
| 5,244,069 | A | | 9/1993 | Cosgrove | 193/5 |
| 5,689,920 | A | * | 11/1997 | Hallsten | 220/495.01 |
| 5,979,450 | A | * | 11/1999 | Baker et al. | 128/849 |
| 6,012,686 | A | * | 1/2000 | Julian | 220/495.08 |
| 6,135,057 | A | * | 10/2000 | Cummings | 119/165 |
| 6,196,370 | B1 | * | 3/2001 | Beale et al. | 193/2 R |
| 6,199,714 | B1 | * | 3/2001 | Thompson | 220/495.04 |

* cited by examiner

*Primary Examiner*—Christopher P. Ellis
*Assistant Examiner*—Jeffrey A. Shapiro
(74) *Attorney, Agent, or Firm*—Donald J. Ersler

(57) ABSTRACT

A concrete chute with liner includes a chute, a pair of rail tubes, a front flange, a rear flange, and a slide-in liner. A single rail tube is attached to each side of the chute. A front flange is attached to a front end of the chute. A rear flange is attached to a rear end of the chute. Each rail tube has an outstanding lip on one side thereof. The inside of the outstanding lip is sized to receive the thickness of the slide-in liner. The slide-in liner is installed by pushing thereof into the outstanding lips and sliding the liner down the length of the chute until thereof stops against a pair of hooks which are attached to the inside of each rail tube at a front thereof. A hook mount is attached to a top of each rail tube at a rear thereof. The hooks and hook mounts allow at least two concrete chutes with a liner to be attached in series.

12 Claims, 4 Drawing Sheets

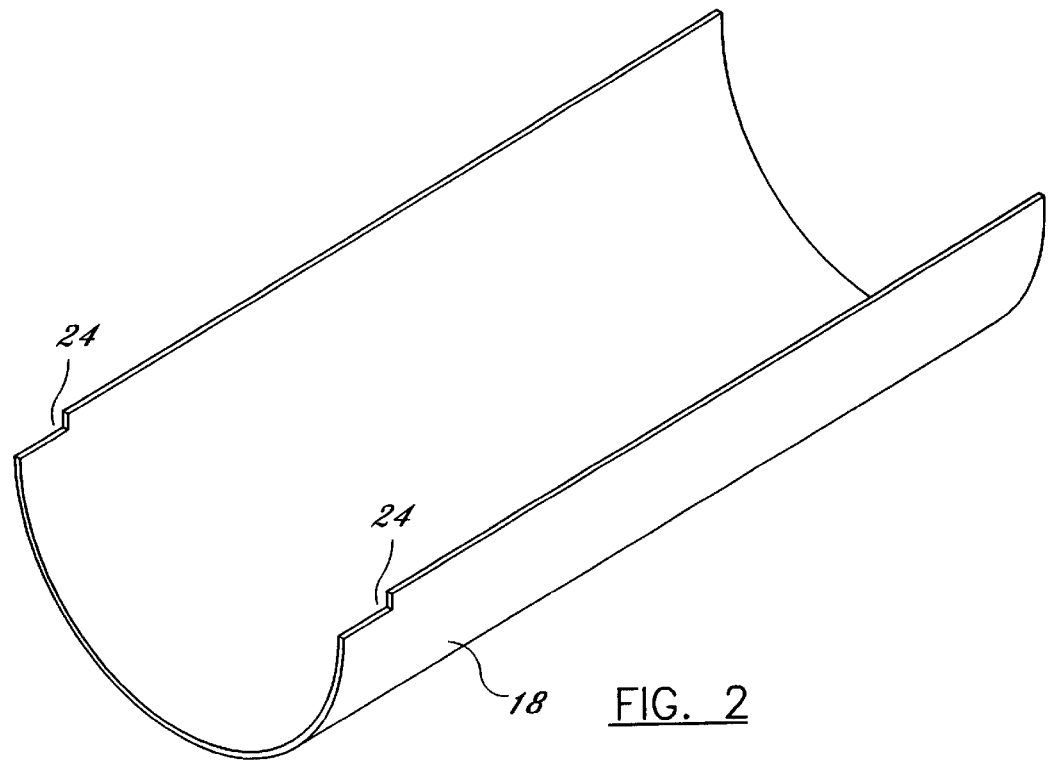
FIG. 2
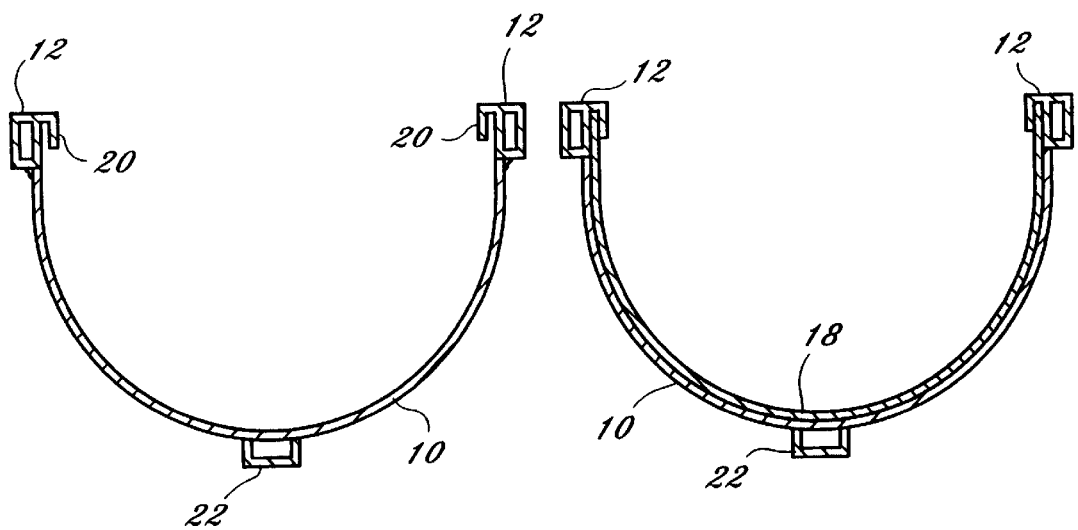
FIG. 3
FIG. 4

CONCRETE CHUTE WITH LINER

CROSS-REFERENCES TO RELATED APPLICATIONS

This is a utility application, taking priority from provisional patent application, serial number 60/159,816 filed on Oct. 15, 1999.

BACKGROUND OF THE INVENTION

1. Field of the Invention

The present invention relates generally to chutes for concrete trucks and more specifically to a concrete chute with liner which is lighter in weight and more durable than that of the prior art.

2. Discussion of the Prior Art

A problem frequently encountered with concrete trucks is the recent demand for reduction of the total weight of the concrete truck. This fact makes any reduction in weight of individual components on the truck a welcome development. One place where the reduction of weight can be made is in the concrete chute. Typically, most concrete chutes are fabricated from steel for strength and durability. Concrete chutes fabricated from aluminum would provide lower weight, but are easily eroded by concrete.

A concrete chute fabricated with aluminum and lined with a plastic material is disclosed in U.S. Pat. No. 4,054,194 to Davis and U.S. Pat. No. 5,244,069 to Cosgrove. Both of these patents utilize threaded fasteners to retain a plastic liner material against a metal chute. The drawback to using threaded fasteners is the time required to unthread and rethread the fasteners when replacing a liner. Further, the threaded fasteners are susceptible to being coated with concrete. If the fastener gets concrete in the threads, the fastener will not be easily unthreaded.

Accordingly, there is a clearly felt need in the art for a concrete chute with liner which weighs less than that of the prior art and which allows the liner to be easily removed without unthreading or removing fasteners.

SUMMARY OF THE INVENTION

The primary objective of the present invention is to provide a concrete chute with liner which weighs less than that of the prior art and which allows the liner to be easily removed without unthreading fasteners.

According to the present invention, a concrete chute with liner includes a chute, a pair of rail tubes, a front flange, a rear flange, and a slide-in liner. A single rail tube is attached to each side of the chute. A front flange is attached to a front end of the chute. A rear flange is attached to a rear end of the chute. Each rail tube has an outstanding lip on one side thereof. The inside of the outstanding lip is sized to receive the thickness of the slide-in liner. The slide-in liner is installed by pushing thereof down the length of the chute until slide-in liner stops against a pair of hooks which are attached to the inside of each rail tube at a front thereof. A hook mount is attached to a top of each rail tube at a rear thereof. The hooks and hook mounts allow at least two concrete chutes with a liner to be attached in series.

Accordingly, it is an object of the present invention to provide a concrete chute with liner which weighs less than that of the prior art.

It is a further object of the present invention to provide a concrete chute with liner that allows the slide-in liner to be replaced with out unthreading or removing fasteners.

Finally, it is another object of the present invention to provide a concrete chute with liner that may be assembled in series to another concrete chute with liner.

These and additional objects, advantages, features and benefits of the present invention will become apparent from the following specification.

BRIEF DESCRIPTION OF THE DRAWINGS

FIG. 2 is a perspective view of a liner from a concrete chute with liner in accordance with the present invention.

FIG. 3 is a cross sectional end view of the concrete chute with liner without a slide-in liner installed in accordance with the present invention.

FIG. 4 is a cross sectional end view of the concrete chute with liner with a slide-in liner fully seated in the chute in accordance with the present invention.

DETAILED DESCRIPTION OF THE PREFERRED EMBODIMENTS

Figure 1:
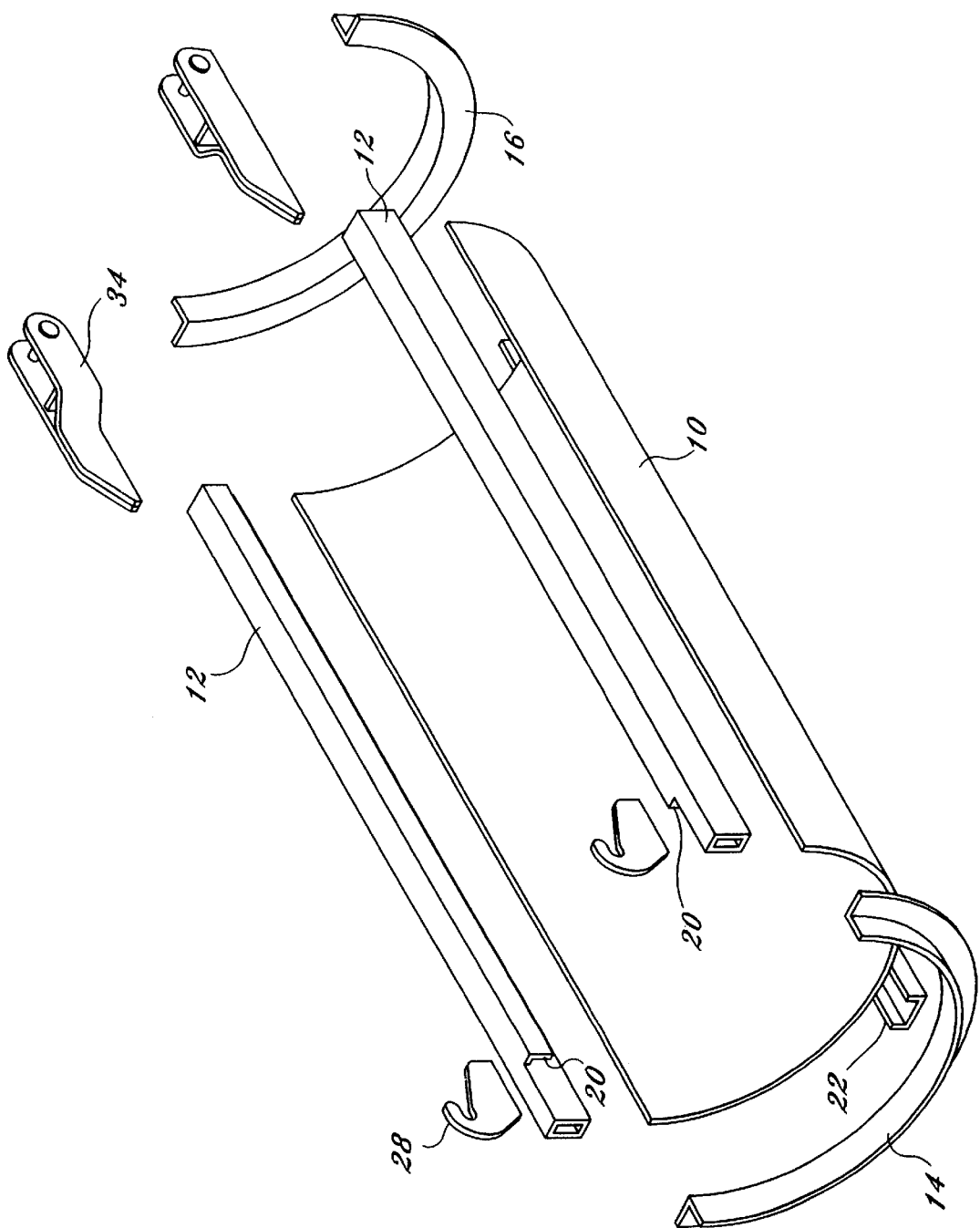
FIG. 1 is an exploded perspective view of a concrete chute without liner in accordance with the present invention.
Figure 5:
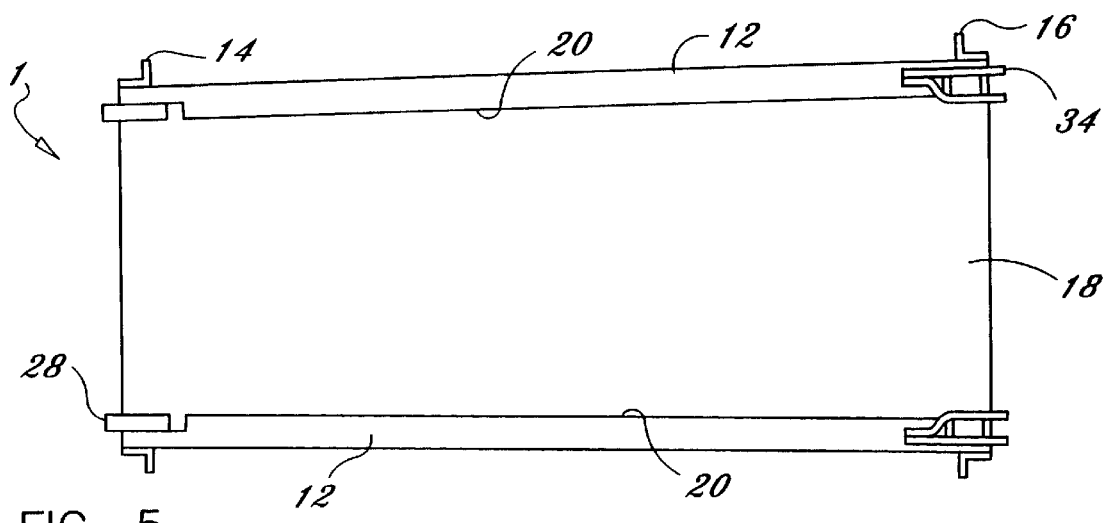
FIG. 5 is a top view of a concrete chute with liner in accordance with the present invention.

With reference now to the drawings, and particularly to FIG. 1, there is shown a perspective view of a concrete chute with liner 1 (a slide-in liner 18 is not shown). With reference to FIGS. 1a–5, the concrete chute with liner 1 includes a chute 10, a pair of rail tubes 12, a front flange 14, a rear flange 16, and the slide-in liner 18. A single rail tube 12 is preferably attached to each side of the chute 10 with welding or any other suitable assembly method. Each rail tube 12 includes an outstanding lip 20 which is sized to slidably receive the slide-in liner 18. The slide-in liner is preferably fabricated from a durable plastic, but could be fabricated from some other lightweight durable material. Each rail tube 12 is preferably fabricated from an extrusion, but could be fabricated by welding an outstanding lip portion to a rectangular tube portion. The length of the outstanding lip 20 is preferably less than the rail tube 12. The front flange 14 is preferably attached to a front end of the chute 10 with welding or any other suitable assembly method. The rear flange 16 is preferably attached to a rear end of the chute 10 with welding or any other suitable assembly method. The front and rear flanges are preferably fabricated by heat forming an aluminum angle to create a curved shape. A support channel 22 may be attached to a bottom of the chute 10 with welding or any other suitable assembly method. The support channel 22 increases the strength of the chute 10. The chute 10 and support channel 22 are also preferably fabricated from aluminum.

Figure 6:
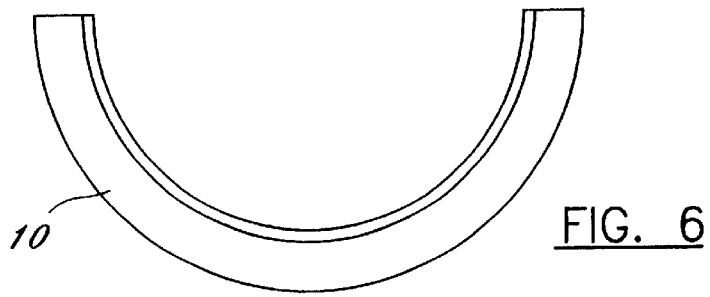
FIG. 6 is a front end view of a chute of a concrete chute with liner in accordance with the present invention.
Figure 6A:
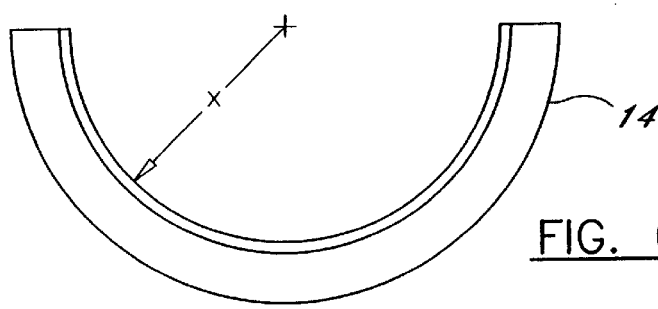
FIG. 6a is a front view of a front flange of a concrete chute with liner in accordance with the present invention.
Figure 6B:
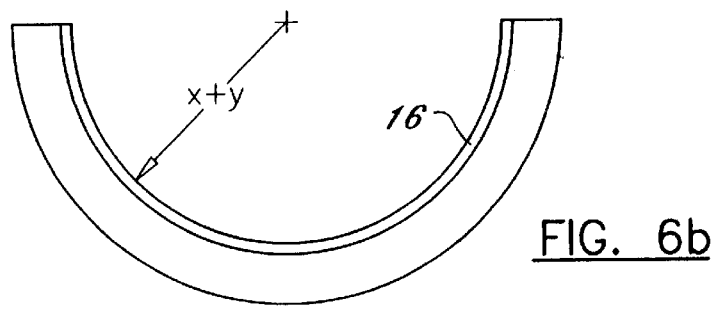
FIG. 6b is a rear view of a rear flange of a concrete chute with liner in accordance with the present invention.

The chute 10 must have a smaller radius or curvature at the front than at the rear as shown in FIG. 6. FIGS. 6a and 6b are provided by way of example and not by way of limitation. A perfect radius may be used to illustrate the difference between the front flange 14 and the rear flange 16 as shown in FIGS. 6a and 6b. The front and rear flanges do not have to have a consistent curvature. The curvature of the front and rear flanges may be a nonconsistent or any other appropriate shape. The front flange 14 has a cross-sectional radius of curvature with a value of "X." While the rear flange 16 has a cross-sectional radius of curvature with a value of "X+Y."

Figure 7:
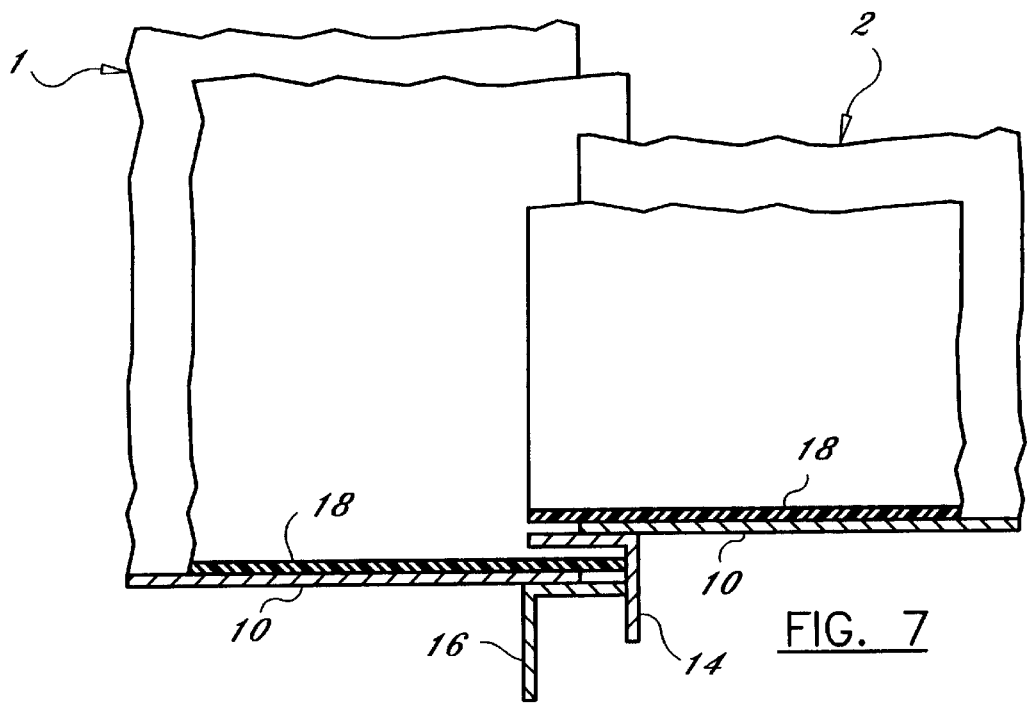
FIG. 7 is a cross sectional view of a first concrete chute with liner attached to a second concrete chute with liner in the chute in accordance with the present invention.

FIG. 7 shows a partial cross sectional view of the slide-in liner 18 of the first concrete chute with liner 1 connected to a second concrete chute with liner 2. The larger curvature of the rear flange 16 fits around and contacts a front of the front flange 14. The overlap of the second concrete chute with liner 2 into the first concrete chute with liner 1 prevents leakage of concrete between the first and second concrete chute liners.

Figure 8:
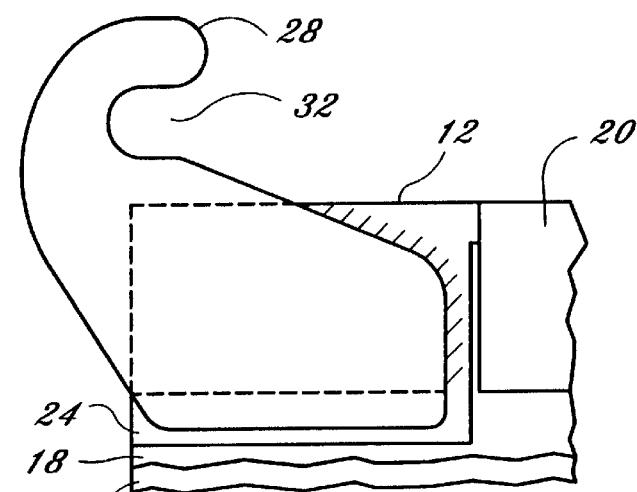
FIG. 8 is an enlarged side view of a hook attached to a rail tube of a concrete chute with liner in accordance with the present invention.
Figure 9:
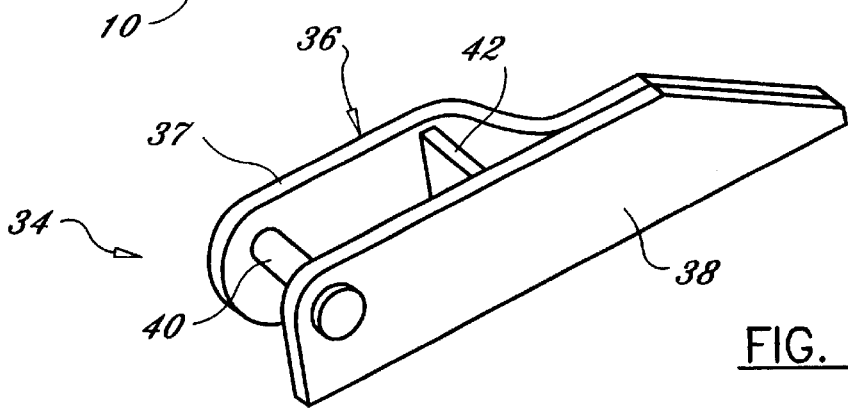
FIG. 9 is an enlarged perspective view of a hook mount of a concrete chute with liner in accordance with the present invention.

A pair of notches 24 are preferably formed in a front of the slide-in liner 18. With reference to FIG. 8, the pair of notches 24 provide clearance for the pair of hooks 28 and also prevent the slide-in liner from sliding out of the front of the chute 10. The slide-in liner 18 is installed by pushing the slide-in liner 18 down the length of the chute 10 until the slide-in liner 18 contacts the pair of hooks 28. The slide-in liner 18 may be easily replaced when thereof wears out.

A single hook 28 is preferably attached to the inside of each rail tube 12 at a front thereof with welding or any other suitable assembly method. A single hook mount 34 is preferably attached to a top of each rail tube 12 at a rear thereof with welding or any other suitable assembly method. The hook mount 34 includes a first side wall 36, a second side wall 38, a retention pin 40, and a support plate 42. The first side plate 36 has an offset portion 37 to provide clearance for the insertion of the hook 28. The first and second side walls are attached to each other at one end with welding or any other suitable assembly method. A support plate 42 is placed in between the first and second side walls and attached thereto with welding or any other suitable assembly method. The retention pin 40 is attached to the first and second walls at the other ends thereof. The retention pin 40 is preferably releasably attached such that it may be easily removed and replaced if thereof wears out. The retention pin 40 is sized to be slidably received by a slot 32 in the hook 28. The hooks 28 and hook mounts 34 allow at least two concrete chutes with a liner 1 to be attached in series.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A concrete chute with liner comprising:
a chute;
a pair of rail tubes, a single said rail tube being attached to each side of said chute, each said rail tube having an outstanding lip on a side thereof; and
a liner being inserted into said pair of rail tubes, said outstanding lip being sized to slidably receive a thickness of said liner;
a front flange being attached to a front of said chute;
a rear flange being attached to a rear of said chute;
a hook being attached to a front of each said rail tube, said hook having a slot formed therein, said liner having a pair of notches formed on a front end of said liner, each notch being sized to receive a single said hook, said pair of notches preventing said liner from sliding out from a front of said concrete chute with liner; and
a hook mount being attached to a rear of each said rail tube, said hook mount enabling at least two concrete chutes with liners to be attached end-to-end.

2. The concrete chute with liner of claim 1, further comprising:
said hook mount including a first side wall, a second side wall, and a retention pin, one end of said first and second side walls being attached to each other, said retention pin being attached to the other ends of said first and second side walls, said retention pin being sized to receive said slot of said hook.

3. The concrete chute with liner of claim 1, further comprising:
A support channel being attached to a bottom of said chute, said support channel increasing the rigidity of the chute.

4. A concrete chute with liner comprising:
a chute;
a pair of rail tubes, a single said rail tube being attached to each side of said chute;
a liner being inserted into said pair of rail tubes;
a hook being attached to a front of each said rail tube, said hook having a slot formed therein, said liner having a pair of notches formed on a front end of said liner, each notch being sized to receive a single said hook; and
a hook mount being attached to a rear of each said rail tube, said hook mount capable of receiving a single said hook.

5. The concrete chute with liner of claim 4, further comprising:
a front flange being attached to a front of said chute and a rear flange being attached to a rear of said chute.

6. The concrete chute with liner of claim 4, further comprising:
said hook mount including a first side wall, a second side wall, and a retention pin, one end of said first and second side walls being attached to each other, said retention pin being attached to the other ends of said first and second side walls, said retention pin being sized to receive said slot of said hook.

7. The concrete chute with liner of claim 4, further comprising:
A support channel being attached to a bottom of said chute, said support channel increasing the rigidity of the chute.

8. The concrete chute with liner of claim 4, further each said rail tube having an outstanding lip on a side thereof, said outstanding lip being sized to slidably receive a thickness of said liner.

9. A concrete chute with liner comprising:
a chute;
a pair of rail tubes, a single said rail tube being attached to each side of said chute;
a liner being inserted into said pair of rail tubes;
a front flange being attached to a front of said chute;
a rear flange being attached to a rear of said chute;

a hook being attached to a front of each said rail tube, said hook having a slot formed therein, said liner having a pair of notches formed on a front end of said liner, each notch being sized to receive a single said hook; and a hook mount being attached to a rear of each said rail tube, said hook mount capable of receiving a single said hook.

10. The concrete chute with liner of claim 9, further comprising:

a front flange being attached to a front of said chute and a rear flange being attached to a rear of said chute.

11. The concrete chute with liner of claim 9, further comprising:

said hook mount including a first side wall, a second side wall, and a retention pin, one end of said first and second side walls being attached to each other, said retention pin being attached to the other ends of said first and second side walls, said retention pin being sized to receive said slot of said hook.

12. The concrete chute with liner of claim 9, further comprising:

each said rail tube having an outstanding lip on a side thereof, said outstanding lip being sized to slidably receive a thickness of said liner.

* * * * *